United States Patent
Saw-Chu et al.

(10) Patent No.: US 6,907,521 B2
(45) Date of Patent: Jun. 14, 2005

(54) ENABLING VIDEO BIOS AND DISPLAY DRIVERS TO LEVERAGE SYSTEM BIOS PLATFORM ABSTRACT

(75) Inventors: Kim L. Saw-Chu, Milpitas, CA (US); David Wyatt, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 655 days.

(21) Appl. No.: 09/968,350

(22) Filed: Sep. 28, 2001

(65) Prior Publication Data

US 2003/0065914 A1 Apr. 3, 2003

(51) Int. Cl.⁷ .......................................... G06F 15/177
(52) U.S. Cl. .................. 713/1; 713/1; 713/2; 713/100; 713/300; 710/260; 345/519; 345/520; 345/522; 345/531
(58) Field of Search .............................. 713/1, 2, 100, 713/300; 710/260; 375/219, 220; 702/119; 345/519, 520, 522, 531

(56) References Cited

U.S. PATENT DOCUMENTS

| | | | | |
|---|---|---|---|---|
| 5,819,050 A | * | 10/1998 | Boehling et al. | 710/104 |
| 6,282,601 B1 | * | 8/2001 | Goodman et al. | 710/260 |
| 6,317,798 B1 | * | 11/2001 | Graf | 710/15 |
| 6,502,146 B1 | * | 12/2002 | Rasmussen et al. | 710/100 |
| 6,505,258 B1 | * | 1/2003 | Sakarda et al. | 710/18 |
| 6,594,721 B1 | * | 7/2003 | Sakarda et al. | 710/304 |
| 6,678,830 B1 | * | 1/2004 | Mustafa et al. | 713/310 |
| 6,697,033 B1 | * | 2/2004 | Leung et al. | 345/5 |
| 6,701,383 B1 | * | 3/2004 | Wason et al. | 719/328 |
| 6,711,642 B2 | * | 3/2004 | Huang | 710/260 |
| 6,757,770 B1 | * | 6/2004 | Terada et al. | 710/260 |

* cited by examiner

Primary Examiner—Lynne H. Browne
Assistant Examiner—Nitin C. Patel
(74) Attorney, Agent, or Firm—Blakley, Sokoloff, Taylor & Zafman LLP (57) ABSTRACT

A method for enabling communication between system BIOS and a graphics device is described herein. In one embodiment, a graphic device sets a system management interrupt (SMI) bit in an interface register located at a predetermined address of a configuration space of a predetermined peripheral device, which triggers an SMI interrupt. As a result, a system BIOS SMI handler is invoked to perform certain operations, including configuring a local memory of the graphics device.

20 Claims, 5 Drawing Sheets

ENABLING VIDEO BIOS AND DISPLAY DRIVERS TO LEVERAGE SYSTEM BIOS PLATFORM ABSTRACT

BACKGROUND

The present invention relates to Basic Input/Output System (BIOS). More particularly, the invention relates to enabling video BIOS and display drivers to leverage system BIOS platform abstract.

Many of the Graphics Memory Controller Hub (GMCH) configuration control registers, affecting graphics and graphics memory, are in the system dynamic random-access memory (DRAM) controller device. Moreover, the graphics interface is assigned as Device#2 while the system memory controller is assigned as Device#0, which is owned by system Basic Input/Output System (BIOS) and system bus drivers. However, in Plug-n-Play (PnP) operating systems, such as Windows 2000, graphics drivers are not permitted to access registers or resources not in the drivers' scope of ownership or declared PnP configuration space. Accordingly, in integrated and/or embedded graphics platforms, the platform-specific information is often accessed via the video BIOS communicating with the system BIOS. This communication utilizes private Int15h calls (i.e. interrupts).

However, the Windows display drivers cannot invoke the Int15h real-mode handler from within the operating system. Moreover, the display drivers cannot use the video BIOS when internal graphics is configured as a non-Video Graphics Array (non-VGA) display adapter. Thus, the legacy VGA video BIOS is not available when the adapter is secondary to either a Peripheral Component Interconnect (PCI) or Accelerated Graphics Port (AGP) VGA adapter.

DETAILED DESCRIPTION

In recognition of the above-stated difficulties with an existing integrated graphics chipset design, such as Graphics Memory Controller Hub (GMCH) design, the present invention describes embodiments for enhanced chipset design that enables communication and handoff between the graphics device and the system Basic Input/Output System (BIOS). Moreover, the enhanced design includes the graphics chipset system management interrupt (SMI) interfaces that enable communication with the system BIOS through a single persistent or consistent mechanism that is available and is operating system (OS) independent. In one embodiment, the graphics chipset (i.e. GMCH), which is sometimes referred to as North-Bridge, provides the capability to generate an SMI under software control by writing to the Peripheral Component Interconnect (PCI) configuration-space register 0E0h through 0E1h in Device#2.

Accordingly, the present embodiments include hardware SMI trigger, a software interface, and an interface means. The hardware SMI trigger is within the BIOS and drivers' addressable space, which enables the hardware to be visible to both the video BIOS and display drivers. The software interface uses a hardware scratch register that may be written and read by video BIOS, display drivers and system BIOS. The system BIOS is signaled using SMI trigger. The interface means includes a means for passing commands and returning status. Consequently, for purposes of illustration and not for purposes of limitation, the exemplary embodiments of the invention are described in a manner consistent with such use, though clearly the invention is not so limited.

In order to properly configure a system, the video BIOS and display drivers need certain information about the platform and user configuration. As stated above, although the information may be available to the system BIOS, this information is often not available to the video BIOS and display drivers. Furthermore, the directive of the Intel driver and BIOS software architecture is to keep the platform specifics in the platform, and to avoid propagating the platform specifics into the video BIOS and/or display drivers. This directive is meant to avoid creating a combinatorial compatibility problem and to ensure correct versioning, given the wide versatility of integrated graphics chipset (i.e. GMCH) configurations.

Accordingly, the embodiments of the present invention define a mechanism in which the video BIOS and display drivers in the graphics chipset (i.e. GMCH) may work as clients of the System BIOS. The mechanism enables the system to notify the software of events. The mechanism also uses the firmware to perform platform-specific functions, which could not otherwise be performed directly by the video BIOS and/or display drivers without detailed knowledge of the platform-specifics. Hence, the present embodiments avoid replicating the platform-specific interfaces by providing for a single common method that the video BIOS and display drivers may use on both desktop and mobile systems.

The enhanced integrated graphics chipset design provides a bimodal interface for detecting, sizing, and initializing or re-initializing a local video memory from the video BIOS or display drivers using common code. This code resides in the system BIOS. Local video memory is a memory that is connected on a separate bus, which is "local" to the graphics controller, as opposed to being connected to the system-wide processor-memory bus. Thus, when present and enabled the local video memory may be initialized by the System BIOS. This allows the system BIOS to be responsible for ensuring the correct setup for the platform and component specific implementation of the local video memory. The system BIOS may also ensure the correct setup of the type of memory used for the local memory. However, the local video memory is associated with, owned, and controlled by, the graphics device. Therefore, from the operating system's perspective, the display driver is expected to manage local video memory. For example, when performing power-management, graphics power management calls are routed through the display driver, and not the system BIOS.

In one mode, an Int15h call is used. However, the Int15h call is typically used only by the video BIOS to call system BIOS during power-up self-test (POST). Hence, this method is typically unavailable to the display drivers that run within the protected mode of the operating system, and therefore, are prohibited from calling software interrupts. In another mode, System Management Interrupt (SMI) is used to trigger entry into System Management Mode (SMM) context. This SMM context is a special operating system independent context supplied by the system BIOS. Thus, both the video BIOS and display drivers may use this context.

In one embodiment, if the video BIOS is called during POST, a new Int15h function (i.e. Function 5F65) may be called. This function is a local memory function starting with the function to return local memory characteristics (i.e. size and speed) and local memory state under various power management conditions. Thus, the video BIOS may not utilize the SMI interface during POST because SMM is often not initialized until just prior to boot. But, the video BIOS may detect that there is no local memory when the new Int15h function is not supported, an error is returned, or zero local memory is returned by the system BIOS in the field for the local memory. However, if a non-zero, non-error value is returned, this value represents the amount of local memory that may be initialized to a returned speed. This information is essential in mode setting. Thus, this embodiment provides faster speed but is more expensive.

In an alternative embodiment, if the video BIOS is not called in POST but a display driver initializes the chipset, the driver cannot reliably count on Int15h interface. Some operating systems do not support the Int15h interface at all, while others may trap the Int15h call in a configuration that interferes with this interface. Therefore, the alternative embodiment provides a register in PCI configuration space for Device#2. The register may be used to trigger an SMI handled by the system BIOS. This register also has read/write configuration bits. SMI interrupts cannot convey CPU register or structure information without this hardware support. Thus, drivers preset the read/write bits that are in turn readable by the system BIOS in SMI. The bits stored in PCI configuration space for Device#2 are equally accessible in all states. Furthermore, unlike the Int15h interface, the SMI/PCI interface allows software to specify the basic parameters used to initialize the local memory (i.e. in terms of size, latency, and speed) or leave these parameters to the system BIOS. Hence, this embodiment provides cheaper solution but slower speed.

Figure 1:
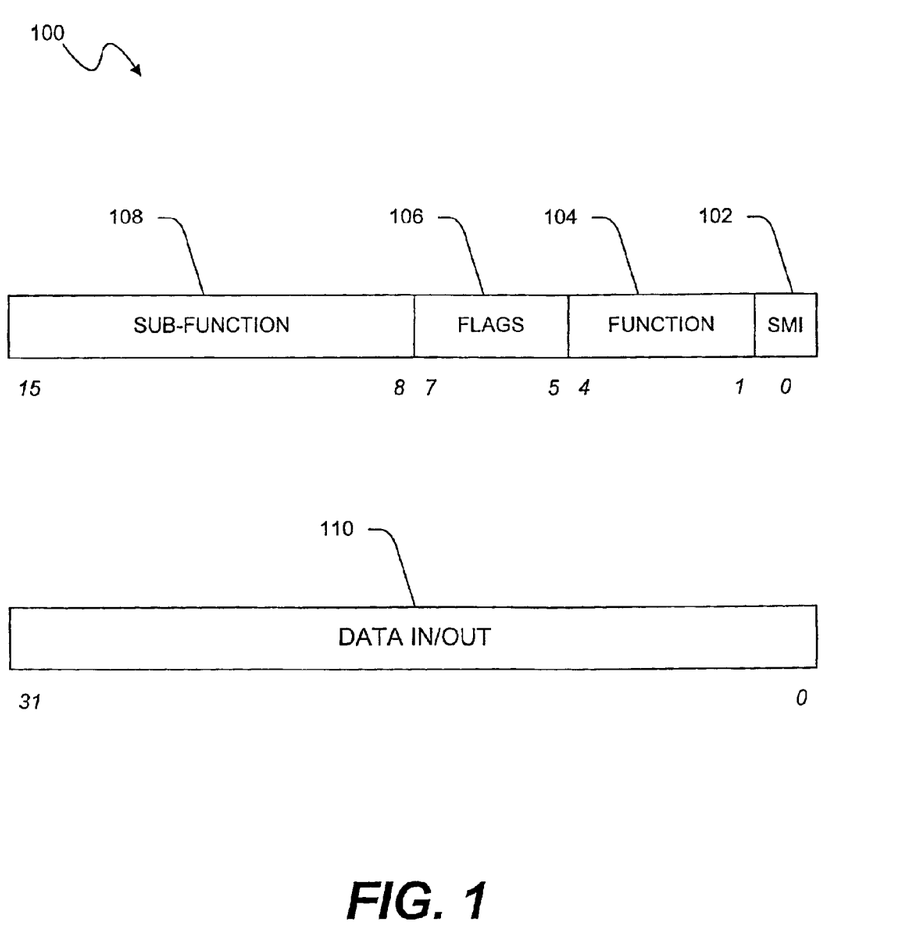
FIG. 1 illustrates a configuration of a local memory/SMM interface register in accordance with and embodiment of the present invention.

FIG. 1 illustrates a configuration of a local memory/SMM interface register 100 in accordance with an embodiment of the present invention. A software driver configures the interface register 100 into two registers within the integrated graphics chipset. These registers that are defined in Device#2 provide the capability to generate an SMI from the graphics chipset under control of the software driver. The registers may also serve as scratch pads for passing parameters to and from the SMI handler. Thus, the client may set up the scratch pad registers in the interface register 100 and may request for a particular service to be performed by the system BIOS. The SMI handler in the system BIOS may then check the fields in the interface register 100 to determine the type of service being requested. In one embodiment, the register appears in PCI configuration space and/or memory-mapped I/O (MMIO) space, which is accessible by drivers and/or BIOS.

In the illustrated embodiment, a bit 102 in the first register triggers an SMI and causes the processor to leave the current context and enter SMM. Other bits 104, 106, 108 in the first register carry function 104, sub-functions 108, and flags 106. The second register provides exchange space 110 for the supplied or returned data.

There are a number of functions supported including local memory initialize, local memory report, and local memory power-down. Both modes of the interface support a call to the system BIOS to power down local memory. Moreover, there must be a method to re-initialize memory on resume after a previous power down. For example, in exiting the S1 power state of an Advance Configuration and Power Interface (ACPI) machine, the system BIOS is not involved since this state is managed under operating system control, which only calls the driver software. Therefore, only the display drivers have the ability and responsibility to perform re-initialization when exiting D1 or D3. This capability provides a means by which the drivers may call system BIOS to perform the platform-specific re-initialization.

Figure 2:
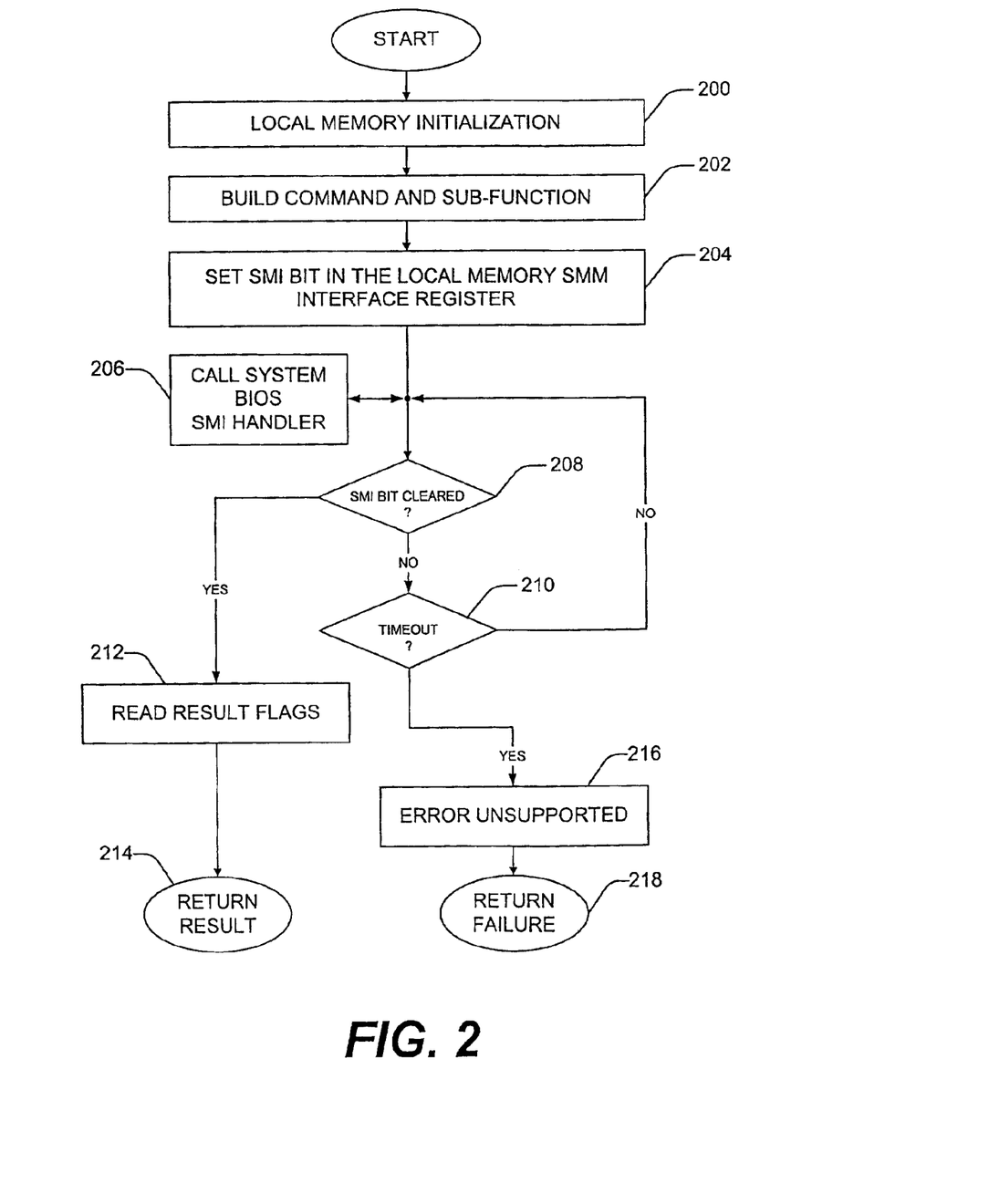
FIG. 2 illustrates a process for enabling communication and handoff between graphics device and system BIOS in a video BIOS and display driver context (client).
Figure 3:
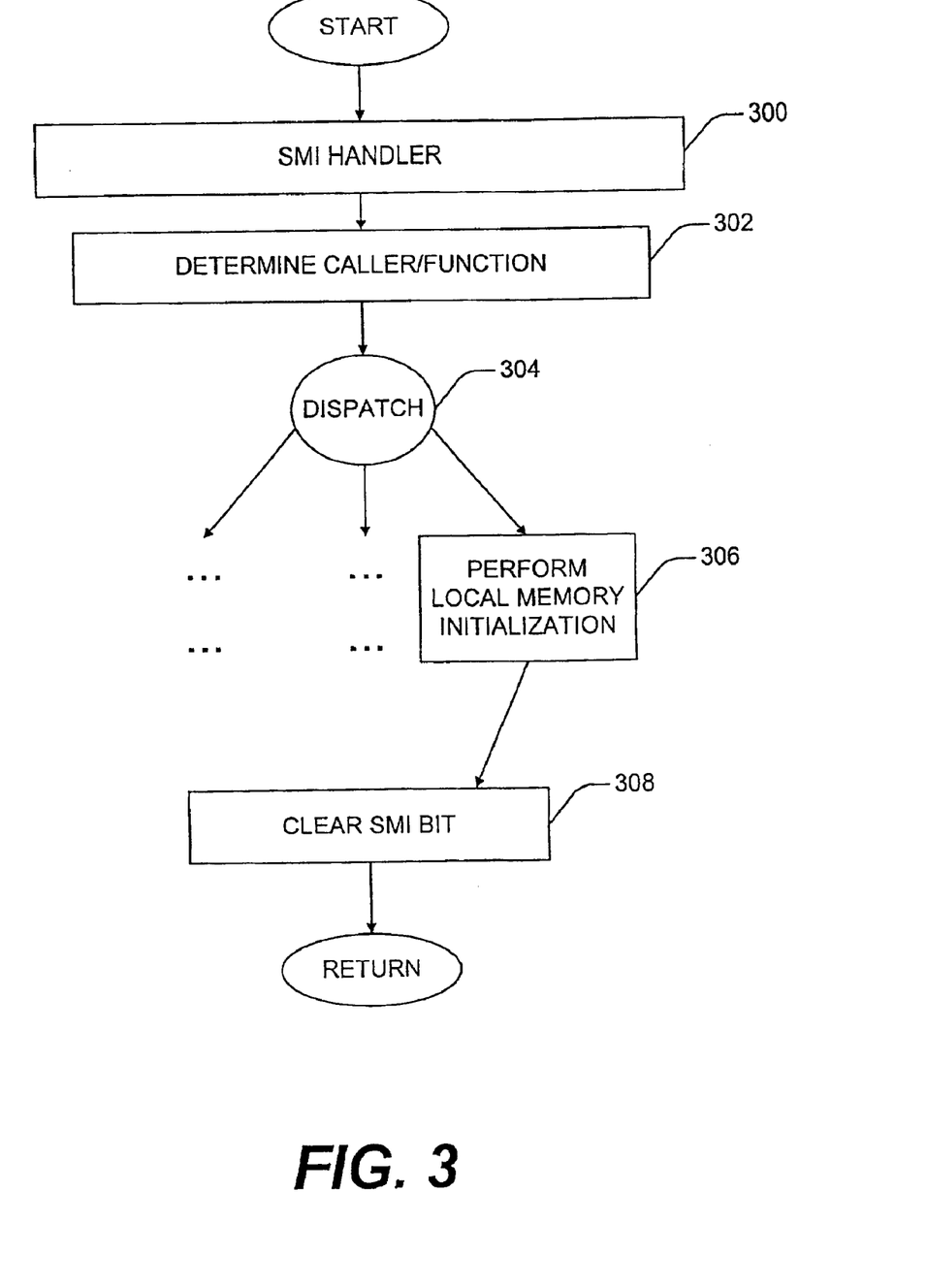
FIG. 3 illustrates a process for enabling communication and handoff between graphics device and system BIOS in a system BIOS or SMM context (server).

A process for enabling communication and handoff between graphics devices and the system BIOS in accordance with an embodiment of the present invention is illustrated as flowcharts in FIGS. 2 and 3. The flowchart of FIG. 2 illustrates video BIOS and display driver context (client), while the flowchart of FIG. 3 illustrates system BIOS or SMM context (server).

In the illustrated embodiment of FIG. 2, the local memory is initialized at 200. Command and sub-function are built in 202. An SMI bit in the local memory/SMM interface register is then set, at 204. In a particular embodiment, the client software may examine the interface register before dispatch, and check the SMI bit (i.e. bit 0) to determine if a client is already using this bit. After setting up the parameters in the interface, the client triggers the SMI by using the register. Hence, in this embodiment, the SMI bit of the register is set to trigger the entry into the system BIOS SMI handler in the server.

Once the system BIOS SMI handler is called (at 206), the client continuously polls for SMI bit clear (at 208) or timeout of the server (at 210). Thus, operations 206 and 208/210 may be performed concurrently. Once the SMI bit clear is detected at 208, the result flags are read (at 212) and returned (at 214). If the server times out at 210, the error is unsupported (at 216) and a failure flag is returned (at 218).

In the illustrated embodiment of FIG. 3, the System BIOS SMI handler is called at 300. The SMI handler then determines the source of the SMI, at 302. In one embodiment, the SMI handler checks the Error Status (ERRSTS) register to determine the caller/function. Once the caller/function has been determined, the SMI handler dispatches (at 304) to various processors to process the function. The SMI handler then processes the function (at 306) as indicated in the interface register after determining that the source is a software-triggered SMI. In one embodiment, the processing of the function utilizes the data supplied in the Parameter register.

After completing the function processing, the SMI handler clears the SMI bit (at 308) before exiting. This indicates that the SMI handler it has been serviced. As stated above, the client software continues to poll for a change from a "1" to "0" in the SMI bit in order to determine that the call has been handled and the data registers contain valid values.

Figure 4:
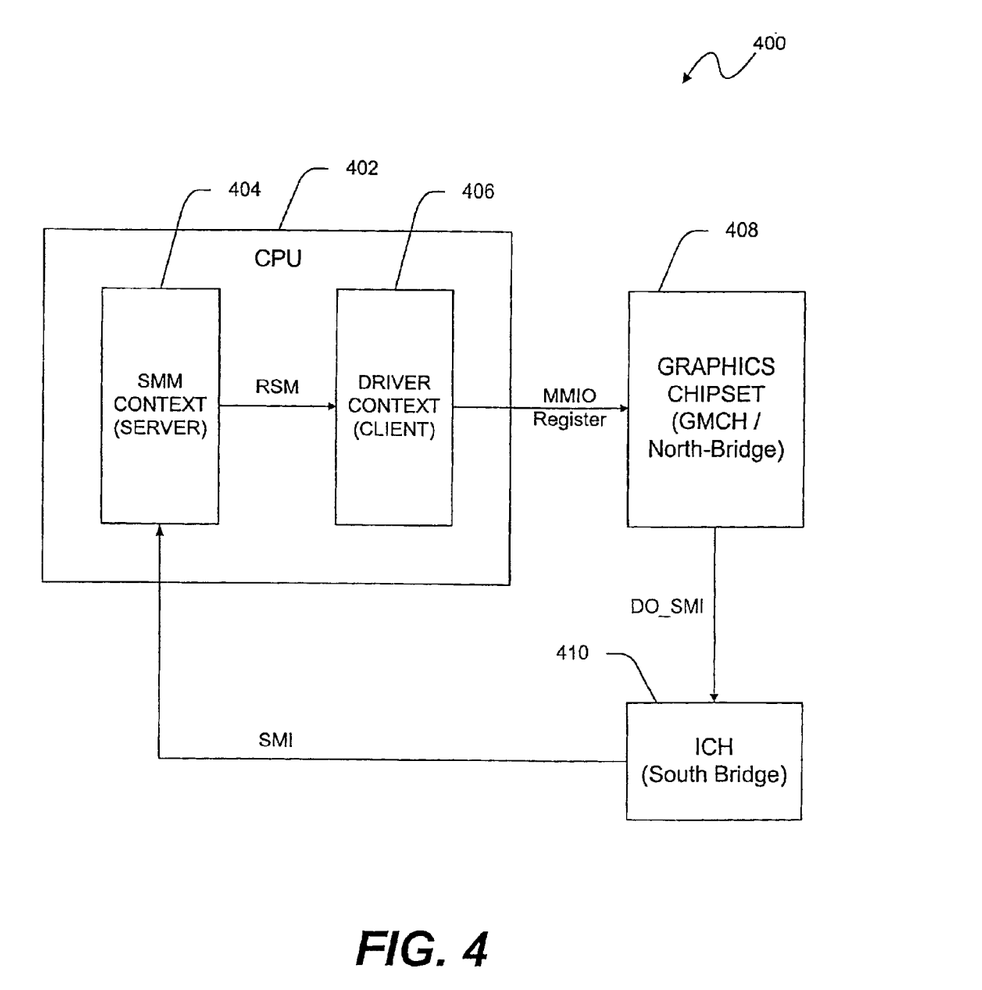
FIG. 4 is a system level SMI flow block diagram according to an embodiment of the present invention.

A system level SMI flow block diagram 400 is illustrated in FIG. 4 according to an embodiment of the present invention. From the system perspective, setting SMI trigger bit in the above-described interface register in the graphics chipset (i.e. GMCH) 408 may be detected by a software running within the context of the operating system. For example, the video BIOS or device drivers may detect the trigger bit. The detection of the bit may be made in real mode or virtual DOS environment to trigger generation of a message (DO_SMI) to I/O Controller Hub (ICH) 410. The ICH 410 is sometimes referred to as South-Bridge. Additionally, the graphics chipset 408 may flag certain register bits indicating that the SMI was initiated by the graphics chipset 408. The South-Bridge 410 processes this message to generate an SMI to the processor 402. This interrupt causes the processor 402 to save the current context and enter SMM. The system BIOS includes the software executed within the SMM context 104. When complete, the SMM code executes an "RSM" (resume) processor instruction causing the CPU to restore the processor context 406. The code then leaves SMM and continues execution in the previous context. This process may be substantially transparent to the operating system. Therefore, the SMM code may clear the interface register bit described above prior to exit. This enables the driver context 406, which triggered the entry into SMI, to perceive that a transition has occurred and that the function is completed.

Figure 5:
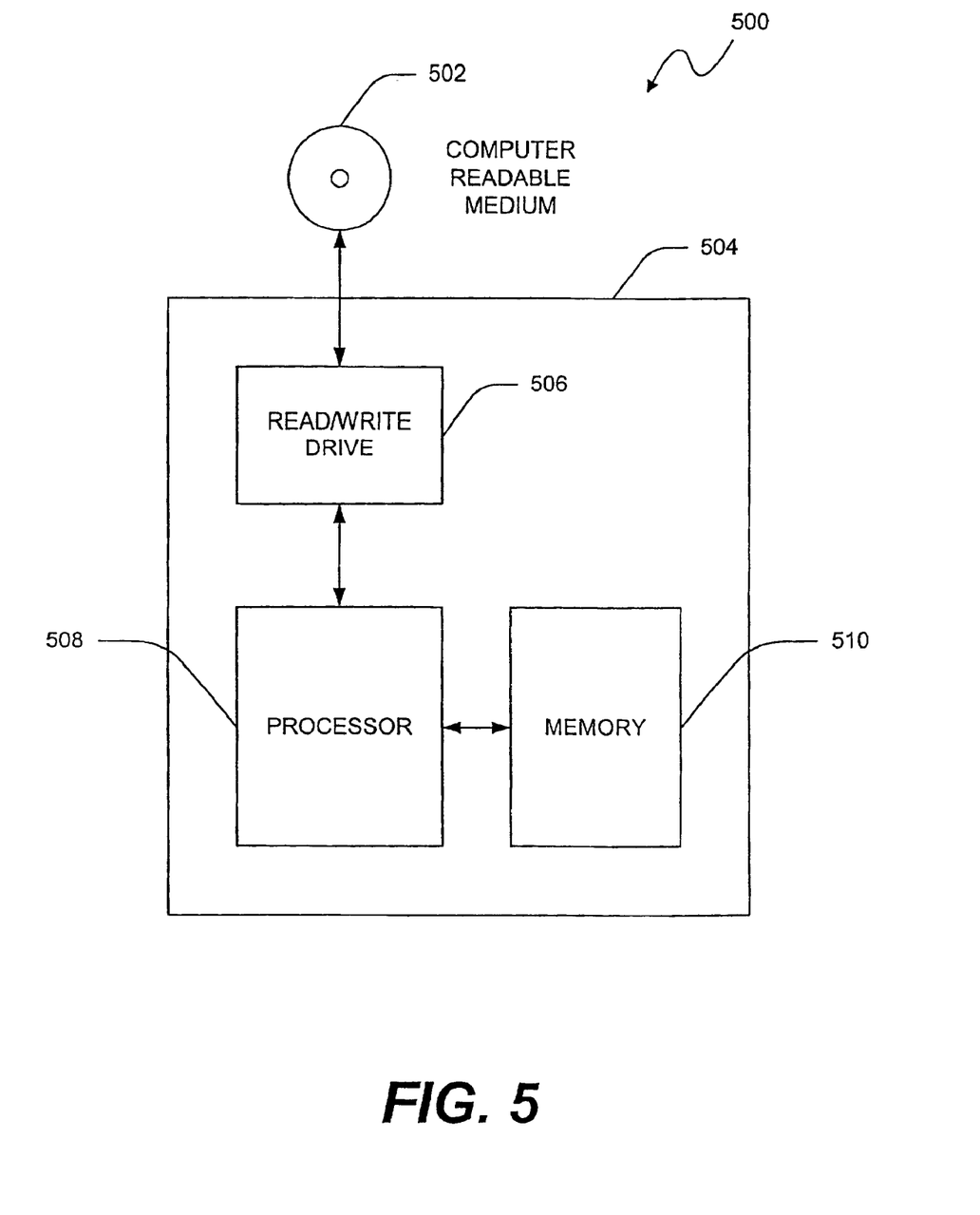
FIG. 5 is a block diagram of a processor-based system which may execute codes residing on a computer readable medium.

FIG. 5 is a block diagram of a processor-based system 500 which may execute codes residing on the computer readable medium 502. The codes are related to communication and handoff method between the graphics device and the system BIOS described in FIGS. 2 through 4. In one embodiment, the computer readable medium 502 may be a fixed medium such as read-only memory (ROM) or a hard disk. In the case of ROM, the code may reside in BIOS. In the case of hard disk, the code may reside in operating system. In another embodiment, the medium 502 may be a removable medium such a floppy disk or a compact disk (CD). A read/write drive 506 in the computer 504 reads the code on the computer readable medium 502. The code is then executed in the processor 508. The processor 508 may access the computer main memory 510 to store or retrieve data.

Advantages of the present embodiments include platform abstraction regardless of characteristics, implementation, and operating systems. Examples of characteristics may include size and speed, while examples of implementation may include local memory configuration through memory module connector or soldered-down. Other advantages include isolation of drivers and video BIOS from platform specifics. This allows generic drivers and BIOS releases that are independent of platform local memory configuration.

The present embodiments also provide reduction in the development cost, support burden, and validation-effort on software. For example, the enhanced integrated graphics chipset design described above leaves much of the complexity of managing memory such as the Rambus dynamic random access memory (RDRAM) timings and levelization to the vendor or original-equipment-manufacturer (OEM). This also allows improved time-to-market for the majority of the market that may not need or use local memory, and avoid unpleasant alternatives that would otherwise require spinning the driver/BIOS to make special version for any special memory types/issues.

Although, previous products have leveraged system BIOS to support local memory management, those products have overlooked many problems of re-initialization. Moreover, these previous products have relied on the memory being continuously in a useable state. However, as described above, the memory may not always be in a useable state but require continuous adaptation of the drivers to perform tasks (especially in the S1/S3 resume scenario) and accommodate platform specifics.

There has been disclosed herein embodiments for for enhanced chipset design that enables communication and handoff between the graphics device and the system BIOS. The enhanced design includes the graphics chipset system management interrupt (SMI) interfaces that enable communication with the system BIOS through a single persistent or consistent mechanism that is available and is operating system (OS) independent.

While specific embodiments of the invention have been illustrated and described, such descriptions have been for purposes of illustration only and not by way of limitation. Accordingly, throughout this detailed description, for the purposes of explanation, numerous specific details were set forth in order to provide a thorough understanding of the present invention. It will be apparent, however, to one skilled in the art that the system and method may be practiced without some of these specific details. In other instances, well-known structures and functions were not described in elaborate detail in order to avoid obscuring the subject matter of the present invention. Accordingly, the scope and spirit of the invention should be judged in terms of the claims which follow.

What is claimed is:

1. A method, comprising:
   a graphics device having a local memory setting a System Management Interrup (SMI) bit in a first interface register located at a first predetermined address of a configuration space of a predetermined peripheral device, including specifying a command and a function identifier; and
   in response to setting the SMI bit of the first interface register, calling a system BIOS SMI handler, wherein the specified command and a service routine identified by the function identifier are executed by the system BIOS SMI handler to configure the local memory of the graphics device.

2. The method of claim 1, wherein said calling system BIOS SMI handler includes:
   determining a caller of a function call.

3. The method of claim 2, wherein said calling system BIOS SMI handler further includes:
   dispatching said function call to perform a corresponding function.

4. The method of claim 3, wherein corresponding function includes local memory initialize.

5. The method of claim 3, wherein corresponding function includes local memory report.

6. The method of claim 3, wherein corresponding function includes local memory power-down.

7. The method of claim 3, wherein said calling system BIOS SMI handler further includes:
   clearing said SMI bit in the interface register.

8. The method of claim 7, further comprising:
   polling to determine if said SMI bit is cleared.

9. The method of claim 8, further comprising:
   determining if said polling has timed out.

10. The method of claim 8, further comprising:
    reading result flags and returning said flags when said SMI bit is cleared.

11. The method of claim 1, wherein the predetermined peripheral device is a PCI device having a device number with a value of 2.

12. The method of claim 1, further comprising:
    accessing a second interface register located at a second predetermined address of the configuration space of the predetermined peripheral device to exchange information between the system BIOS and the graphics device in response to calling the SMI handler via the first interface register.

13. A communication system, comprising:
an interface register located at a predetermined address of a configuration space of a predetermined peripheral device to enable communication between a system BIOS and a graphics device wherein the interface register includes a SMI bit when set by the graphics device to trigger a system BIOS SMI handler; and
a scratch pad to provide exchange space for passing interface parameters between the SMI handler and the graphics device when the system BIOS SMI handler is called.

14. The method of claim 13, further comprising:
an Input/Output Controller Hub (ICH) to process said SMI bit and generate an input.

15. The method of claim 14, further comprising:
a processor having a server mode and a client mode, said processor to receive said interrupt from said ICH, and trigger said server mode.

16. The system of claim 15, wherein said server mode is a System Management Mode (SMM).

17. A communication system, comprising:
an interface register to enable communication between a system BIOS and a graphics
device, the interface register including an SMI bit to trigger a system BIOS SMI handler,
a scratch pad to provide a exchange space for passing interface parameters to and from the SMI handler;
an Input/Output Controller Hub (ICH) to process the SMI bit and generate an interrupt; and
a processor having a server mode and a client mode, the processor to receive the interrupt from said ICH, and trigger the server mode,
wherein said client mode is a video BIOS and graphics driver context.

18. A computer readable medium containing executable instructions which, when executed in a processing system, causes the system to enable communication between system BIOS and a graphics device, comprising:
a graphics device having a local memory setting a System Management Interrupt (SMI) bit in a first interface register located at a first predetermined address of a configuration space of a predetermined peripheral device, including specifying a command and a function identifier; and
in response to setting the SMI bit of th interface register, calling system BIOS SMI handler, wherein the specified command the a service routine identifier by the function identifier are executed by the system BIOS SMI handler to configure the local memory of the graphics device.

19. The medium of claim 18, wherein said calling system BIOS SMI handler includes:
determining a caller of a function call.

20. The medium of claim 19, wherein said calling system BIOS SMI handler includes:
dispatching said function call to perform a corresponding function.

* * * * *

UNITED STATES PATENT AND TRADEMARK OFFICE
CERTIFICATE OF CORRECTION

PATENT NO. : 6,907,521 B2
DATED : June 14, 2005
INVENTOR(S) : Saw-Chu et al.

It is certified that error appears in the above-identified patent and that said Letters Patent is hereby corrected as shown below:

Column 6,
Line 23, delete "Interrup" and insert -- Interrupt --.
Lines 41, 43 and 45, after "wherein", insert -- said --.

Column 7,
Line 5, after "device" insert -- , --.
Line 12, delete "method" and insert -- system --.
Line 14, delete "input" and insert -- interrupt --.
Line 25, delete "," and insert -- ; --.

Signed and Sealed this

Sixth Day of September, 2005

JON W. DUDAS
*Director of the United States Patent and Trademark Office*